United States Patent
Suder et al.

(10) Patent No.: US 6,848,413 B1
(45) Date of Patent: Feb. 1, 2005

(54) METHOD FOR HOMOGENOUS CHARGE COMPRESSION IGNITION START OF COMBUSTION CONTROL

(75) Inventors: Timothy A. Suder, Greencastle, PA (US); Steven Stuart Trevitz, Mercersburg, PA (US); Benjamin C. Shade, Masontown, WV (US); Chun Tai, Hagerstown, MD (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 10/726,684

(22) Filed: Dec. 4, 2003

(51) Int. Cl.⁷ ............................................. G02D 19/18
(52) U.S. Cl. ....................................... 123/286; 123/253
(58) Field of Search ................................. 123/294, 302, 123/305, 253, 286, 288

(56) References Cited

U.S. PATENT DOCUMENTS

| | | | |
|---|---|---|---|
| 1,839,008 A | 12/1931 | Attwood | |
| 2,045,858 A | 6/1936 | Jung | |
| 2,089,279 A | 8/1937 | Loeffler | |
| 2,120,290 A | 6/1938 | Meyer | |
| 2,254,173 A | 8/1941 | Ericson | |
| 2,890,688 A | 6/1959 | Goiot | |
| 3,938,482 A | 2/1976 | Akamatsu | |
| 3,957,021 A * | 5/1976 | Loyd, Jr. | 123/209 |
| 4,162,664 A * | 7/1979 | Fleming | 123/288 |
| 4,204,506 A * | 5/1980 | Bowling | 123/294 |
| 4,232,641 A | 11/1980 | Curtil | |
| 4,589,398 A | 5/1986 | Pate et al. | |
| 4,768,481 A | 9/1988 | Wood | |
| 5,009,199 A | 4/1991 | MacFarlane | |
| 5,027,764 A | 7/1991 | Reimann | |
| 5,060,609 A | 10/1991 | Merritt | |
| 5,101,776 A | 4/1992 | Ma | |
| 5,201,907 A | 4/1993 | Hitomi et al. | |
| 5,476,072 A | 12/1995 | Guy | |
| 5,752,481 A * | 5/1998 | Faulkner | 123/294 |
| 5,838,906 A | 11/1998 | Doyle et al. | |
| 6,505,601 B1 | 1/2003 | Jorach et al. | |
| 6,561,157 B2 | 5/2003 | zur Loye et al. | |
| 6,637,393 B2 | 10/2003 | Sutherland | |
| 2002/0026926 A1 | 3/2002 | Loye et al. | |
| 2003/0097998 A1 | 5/2003 | Gray, Jr. | |

* cited by examiner

*Primary Examiner*—Bibhu Mohanty
(74) *Attorney, Agent, or Firm*—Rothwell, Figg, Ernst & Manbeck, PC

(57) ABSTRACT

An internal combustion cylinder assembly includes a cylinder having a combustion chamber and a piston. An intake valve provides a working fluid to the combustion chamber while the piston moves from a top dead center position to a bottom dead center position. A pre-combustion chamber is connected communicably to the combustion chamber via a Suder valve and conveys a portion of the working fluid to the pre-combustion chamber while the Suder valve is substantially open. The Suder valve may open substantially simultaneously with the intake valve, remain substantially open while the piston moves from the top dead center position to the bottom dead center position during an intake stroke, and close substantially while the piston is returning to the top dead center position during a compression stroke.

17 Claims, 16 Drawing Sheets

METHOD FOR HOMOGENOUS CHARGE COMPRESSION IGNITION START OF COMBUSTION CONTROL

BACKGROUND OF THE INVENTION

1. Field of the Invention

The invention relates to internal combustion engines, and in particular, to homogenous charge compression ignition (HCCI) engines.

2. Description of the Related Art

Emission control standards for internal combustion engines have tended to become more stringent over time. The sorts of emissions to be controlled tend to fall into at least four broad categories: unburned hydrocarbons, carbon monoxide particulates, and oxides of nitrogen (NOx).

Unburned hydrocarbons and carbon monoxide tend to be products of incomplete combustion of a hydrocarbon fuel. Each atom of carbon in the fuel requires two atoms of oxygen with which to combine for complete combustion. If each carbon atom finds two oxygen atoms with which to combine, carbon dioxide is formed. The remaining hydrogen atoms combine with two oxygen atoms apiece to form water.

If only one atom of oxygen is available to combine with a carbon atom, on the other hand, carbon monoxide is formed. If no oxygen is available, hydrocarbons are left unburned. Thus, reduction of unburned hydrocarbons and carbon monoxide depends on the provision of adequate oxygen during combustion to oxidize the carbon atoms completely.

Compression ignition engines are generally run with an excess of air over the stoichiometric ratio to ensure adequate oxygen supplies are available for combustion. Particulates tend to be produced by reactions that are close to stoichiometric as well, so the availability of an excess of oxygen over stoichiometric may reduce those as well.

Nitrogen is a major component of air. Nitrogen is inert at standard temperature and pressure. Nitrogen becomes reactive, however, at heightened temperatures and pressures. The heat associated with high temperatures thus serves as a catalyst for nitrogen. High temperatures tend to be associated with complete combustion, since combustion is exothermic. The high temperatures associated with complete combustion may thus cause nitrogen to react with oxygen and form oxides of nitrogen.

One way to control the production of oxides of nitrogen is to limit the combustion chamber temperatures reached during combustion. Since heat associated with high combustion temperatures serves as a catalyst for nitrogen, reducing the peak combustion chamber temperature may reduce the reactivity of nitrogen. Since reducing the peak temperature ameliorates one of the conditions necessary for the production of oxides of nitrogen, there may be a consequent reduction in the quantity of oxides of nitrogen that are produced.

Fuel is injected, on the average, into the center of a combustion chamber in a conventional compression-ignition engine. The fuel is injected after the incoming air charge has been compressed sufficiently to ignite the fuel, and thus the fuel burns almost immediately. Since the fuel burns almost immediately, it has relatively little time to distribute itself evenly about the combustion chamber. Since the fuel is not distributed evenly during combustion, but rather is localized, a large quantity of fuel is available in a small volume to support combustion. Since a large quantity of fuel is available to support combustion, combustion proceeds for a relatively long period of time, and high temperatures of combustion are able to develop.

With HCCI engines, on the other hand, fuel is injected during the compression stroke, while the incoming air charge is being compressed. The combustion event occurs once the air charge has been compressed enough to raise its temperature to the kindling temperature of the fuel. The fuel thus has some time to propagate throughout the volume of the combustion chamber before combustion takes place. Furthermore, the swirling and tumbling of the air charge during compression may promote distribution of the fuel before the combustion event takes place.

Since the fuel has time to propagate throughout the combustion chamber volume before ignition takes place, ignition may occur simultaneously throughout the combustion chamber volume. This may, for example, allow the combustion process to rely less on propagation of a flame front to burn the fuel than would be the case with conventional compression ignition.

The combustion rate may consequently be higher, since there will be no delay associated with waiting for a flame front to progress across the combustion chamber. This may allow a more dilute mixture of air and fuel to be used. This may also allow the peak temperature to be reduced, thereby reducing formation of oxides of nitrogen, since the fuel burns completely in less time than it would take for comparable localized combustion.

Since the combustion event in an HCCI engine occurs once the air charge has been compressed enough to raise its temperature to the kindling temperature of the fuel, the timing of the combustion event may vary somewhat from cycle to cycle. The timing of the combustion event in an HCCI engine may thus be relatively more difficult to control than the timing of a combustion event in a conventional compression ignition engine. Variability of combustion timing may manifest itself as roughness or pre-detonation, also known as "knocking." It would be desirable for the timing of the combustion event in an HCCI engine to be more precisely controllable.

SUMMARY OF THE INVENTION

In a first aspect of the invention, an internal combustion cylinder assembly includes a cylinder having a combustion chamber at an end thereof, a piston disposed slidably within the cylinder, the piston having a top dead center position proximate to the combustion chamber and a bottom dead center position distal from the combustion chamber, an intake runner connected communicably to the combustion chamber via an intake valve, the intake runner providing a working fluid to the combustion chamber when the intake valve is substantially open and the piston moves from the top dead center position to the bottom dead center position, a pre-combustion chamber connected communicably to the combustion chamber via a Suder valve, the combustion chamber conveying a runner ion of the working fluid to the pre-combustion chamber when the Suder valve is substantially open, wherein the Suder valve opens substantially simultaneously with the intake valve, the Suder valve remains substantially open while the piston moves from the top dead center position to the bottom dead center position during an intake stroke, and the Suder valve closes substantially while the piston is returning to the top dead center position during a compression stroke.

In a second aspect of the invention, a method of controlling combustion in an internal combustion engine includes connecting a pre-combustion chamber to a combustion chamber, drawing a working fluid into a cylinder through an intake runner in the combustion chamber, closing the intake runner with an intake valve, compressing the working fluid in the combustion chamber and the pre-combustion chamber, adding a pilot quantity of fuel to the working fluid while the working fluid is being compressed, disconnecting the pre-combustion chamber from the combustion chamber before the compression is complete, compressing the working fluid further in the combustion chamber, and igniting the fuel with heat generated by compressing the working fluid.

In a third aspect of the invention, a system for controlling combustion in an internal combustion engine includes means for connecting a pre-combustion chamber to a combustion chamber, means for drawing a working fluid into a cylinder through an intake runner in the combustion chamber, means for closing the intake runner with an intake valve, means for compressing the working fluid in the combustion chamber and the pre-combustion chamber, means for adding a pilot quantity of fuel to the working fluid while the working fluid is being compressed, means for disconnecting the pre-combustion chamber from the combustion chamber before the compression is complete, means for compressing the working fluid further in the combustion chamber, and means for igniting the fuel with heat generated by compressing the working fluid.

DETAILED DESCRIPTION OF THE PREFERRED EMBODIMENTS

Since the combustion event in an HCCI engine occurs once the air charge reaches the kindling temperature of the fuel, the timing of the combustion event may depend, inter alia on the initial temperature and pressure of the air charge, the compression ratio of the engine, the piston speed, and the heat transfer characteristics of the materials surrounding the combustion chamber.

The initial pressure may be a static pressure, such as the atmospheric pressure, as well as a dynamic pressure due to, for example, the momentum with which the incoming air charge enters the cylinder. The initial temperature and static pressure of the air charge may vary with the weather and the altitude at which the engine is operating.

The dynamic pressure may also vary with the volumetric efficiency of the engine. Volumetric efficiency, in turn, may vary with the engine speed, and also with the speed of a supercharger or turbo-charger. A lagging turbo-charger, for example, will produce lower initial in-cylinder pressures.

The piston speed may also affect the volumetric efficiency of the engine. Piston speed varies with the speed of the engine between an idle and red line or a governed speed. Higher piston speeds may impart more momentum to the incoming air charge, resulting in better cylinder filling and higher in-cylinder pressures.

The heat transfer characteristics of the materials surrounding the combustion chamber may vary with the temperature differential across the materials, such as the temperature differential between the combustion chamber and the engine coolant. The timing of the combustion event will thus vary with the operating conditions of the engine.

Of these parameters only the compression ratio is constant. The initial temperature and pressure of the air charge, the piston speed, and the heat transfer characteristics of the materials surrounding the combustion chamber all vary with the operating conditions of the engine. It would be desirable for the compression ratio of the engine to be alterable to compensate for variation of the other parameters.

Although the embodiments of the invention described herein are described in the context of an HCCI engine, the concept of the invention could be applied to other types of ignition as well, such as, e.g. a conventional compression-ignited engine or a spark-, hotbulb- or glowplug-ignited engine. Furthermore, although the embodiments of the invention are described in the context of a four-cycle engine, the principle of the invention may be applied to a two-stroke engine as well.

Figure 1:
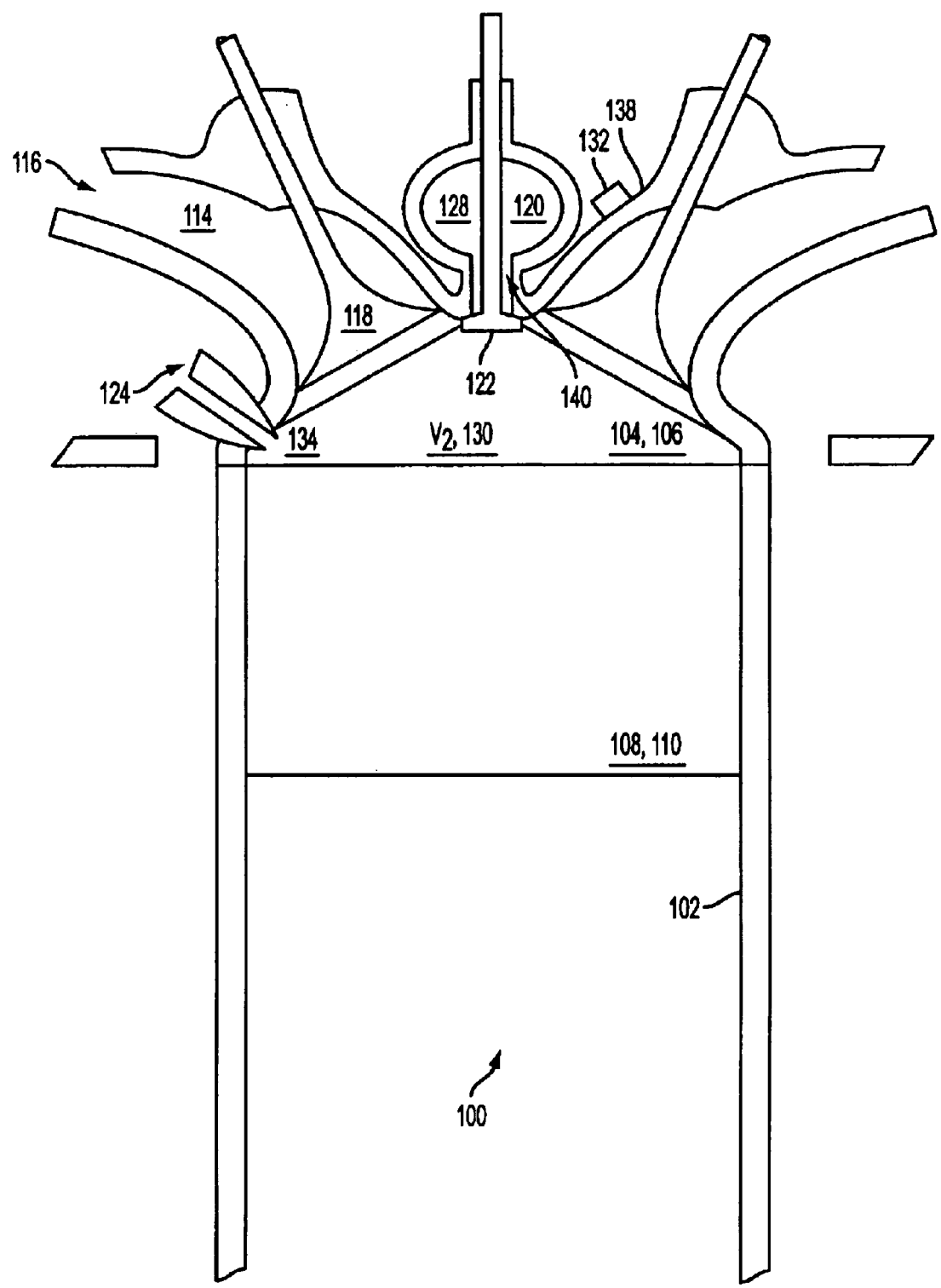
FIG. 1 is a section through an internal combustion cylinder assembly according to a first and third embodiments of the invention.
Figure 2:
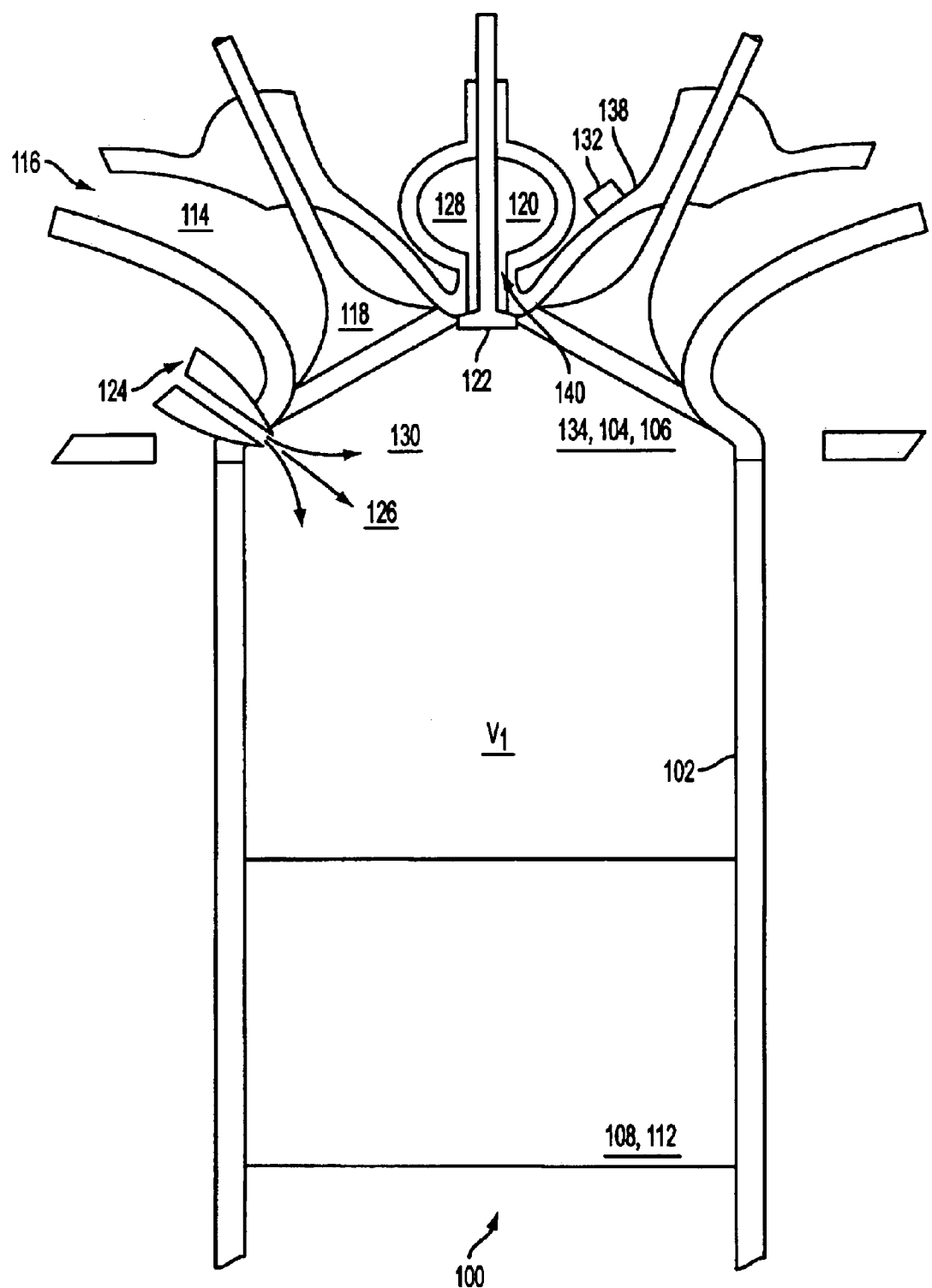
FIG. 2 is a section through the embodiment shown in FIG. 1.
Figure 3A:
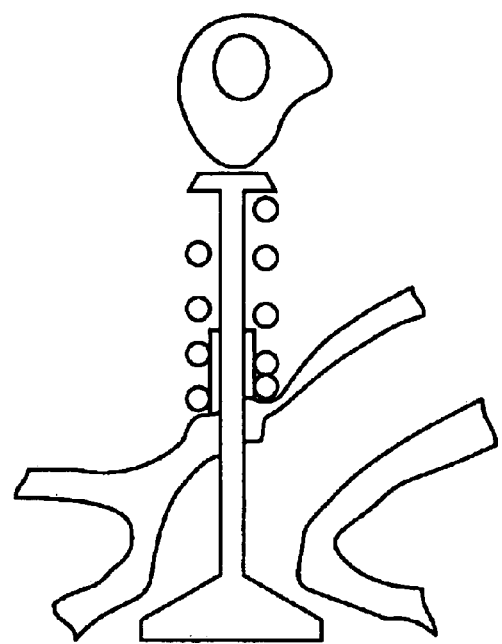
FIG. 3 are schematic diagrams of various actuators for use with a Suder valve.
Figure 3B:
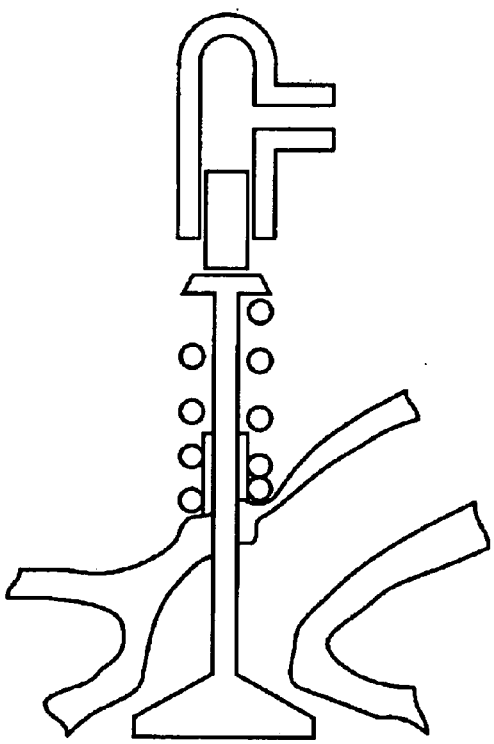
Figure 3C:
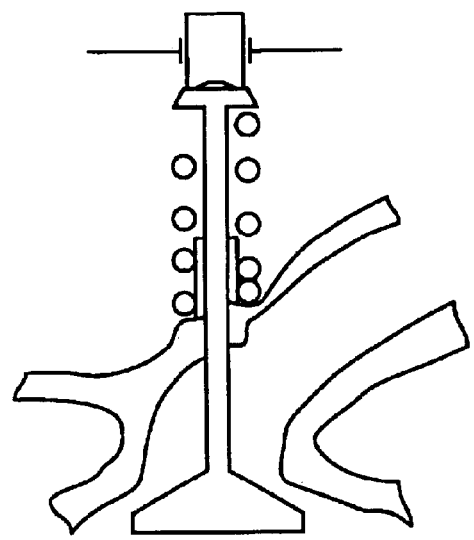
Figure 3D:
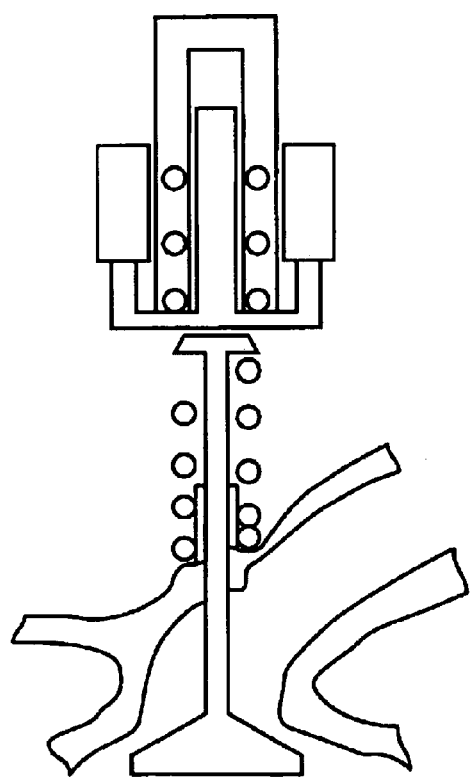
Figure 3E:
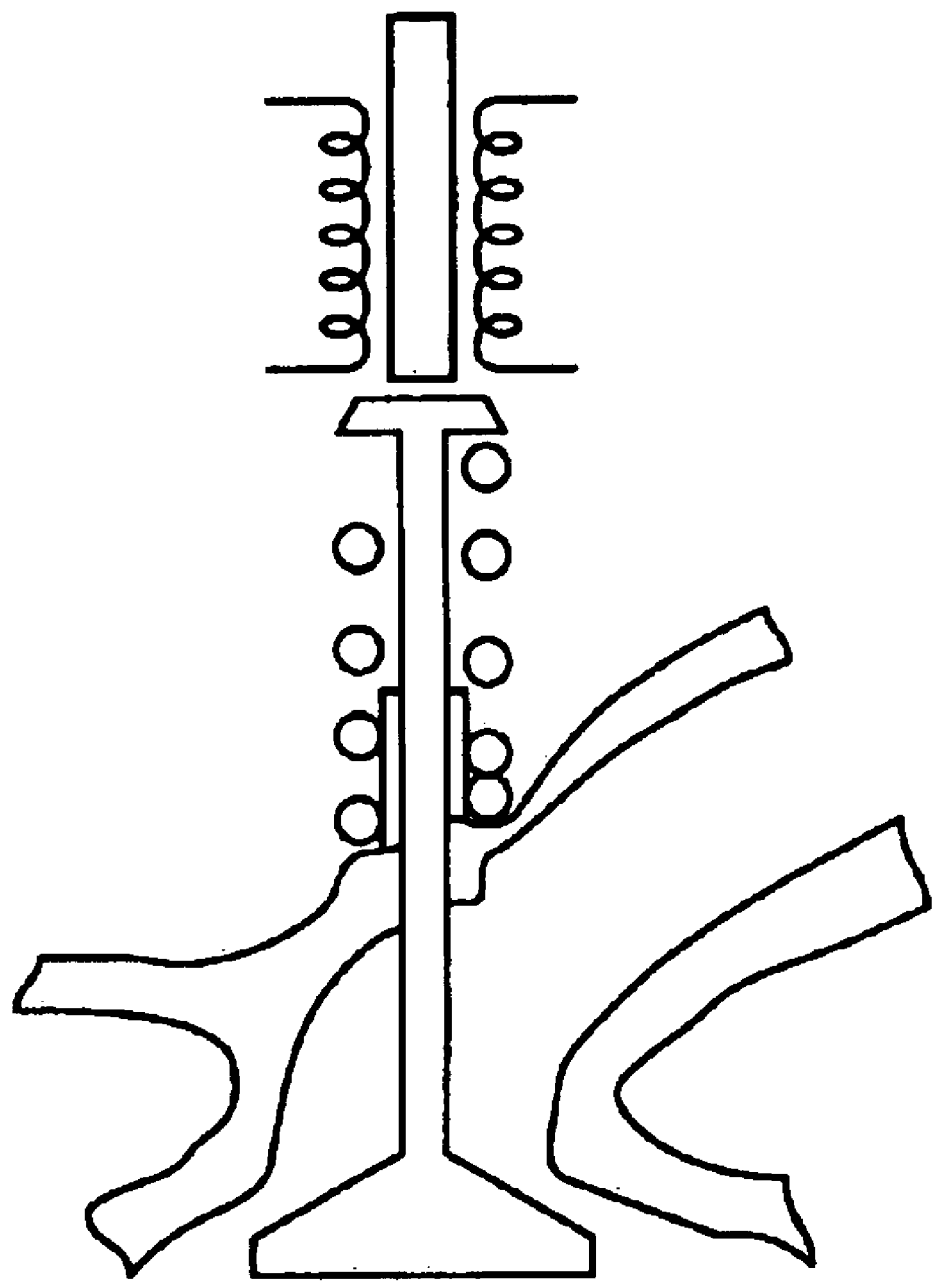
Figure 4A:
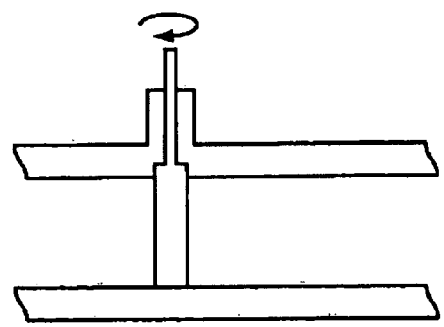
FIG. 4 are schematic diagrams of various Suder valves for use with an embodiment of the invention.
Figure 4B:
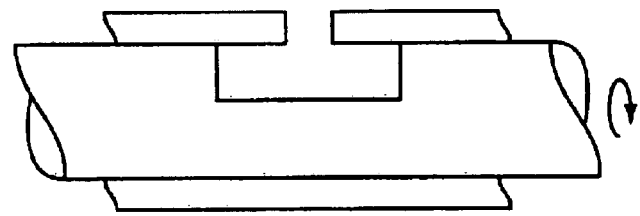
Figure 4C:
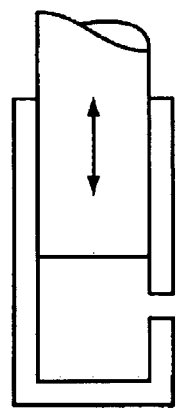
Figure 4D:
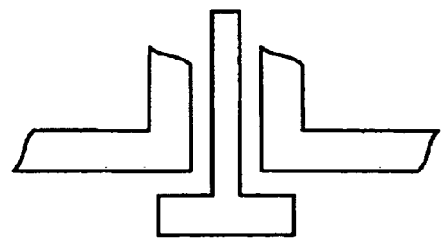

In FIGS. 1 and 2 is shown an internal combustion cylinder assembly 100 according to a first embodiment of the invention. Cylinder assembly 100 includes a cylinder 102 having a combustion chamber 104 at an end 106 thereof and a piston 108 disposed slidably within cylinder 102. Piston 108 may have a top dead center position 110 proximate to combustion chamber 104 and a bottom dead center position 112 distal from combustion chamber 104.

An intake runner 114 may be connected communicably to combustion chamber 104 via an intake valve 118. Intake runner 114 may provide a working fluid 116 to combustion chamber 104 when intake valve 118 is substantially open and piston 108 moves from top dead center position 110 to bottom dead center position 112. Working fluid 116 may be, e.g. air, such as a mixture of nitrogen, oxygen, carbon dioxide, water vapor, and trace elements such as argon.

A compression ratio (CR) of cylinder 102 may be defined as the volume of cylinder 102 when piston 108 is at bottom dead center position 112 ($V_1$) relative to the volume of cylinder 102 when piston 108 is top dead center position 110 ($V_2$). In one embodiment, $V_1$ may be twenty times the size of $V_2$, for a CR of 20:1. Since piston 108 is proximate to combustion chamber 104 at top dead center position 110, the volume of combustion chamber 104 is substantially $V_2$.

A pre-combustion chamber 120 may be connected communicably to combustion chamber 104 via a Suder valve 122. Combustion chamber 104 may convey a portion of working fluid 116 to pre-combustion chamber 120 when Suder valve 122 is substantially open. In several embodiments, Suder valve 122 may be actuated by an actuator such as a cam lobe, an hydraulic actuator, a piezoelectric motor, a voice coil, or a solenoid, as shown in FIG. 3. In several embodiments, Suder valve 122 may be a gate valve, a rotary valve, a sleeve valve, or a poppet valve, as shown in FIG. 4.

Since combustion chamber 104 is connected to pre-combustion chamber 120 when Suder valve 122 is substantially open, the volumes of pre-combustion chamber 120 and combustion chamber 120 are additive when Suder valve 122 is substantially open. If Suder valve 122 were open when piston 108 was at bottom dead center position 112 as well as when it was at top dead center position 110 the CR will be lower than it would be if Suder valve 122 were open when piston 108 was at bottom dead center position 112 but closed when it was at top dead center position 110. Suder valve 122 may therefore be used to alter the CR of the engine.

Furthermore, since the temperature reached by the working fluid 116 after it is compressed is related to the amount by which it is compressed, the temperature can be raised or lowered by raising or lowering the CR. Thus, if the temperature of working fluid 116 remained lower than a kindling temperature of fuel if Suder valve 122 was left open during the compression stroke but rose higher than the kindling temperature if Suder valve 122 was closed during the compression stroke, the onset of combustion could be controlled by closing Suder valve 122 during the compression stroke.

In one embodiment, the temperature of the fully compressed working fluid is 25% lower at top dead center position 110 when Suder valve 122 is left open during the compression stroke than it is when Suder valve 122 is closed. Since the temperature of working fluid 116 when piston 108 is at top dead center position 110 will be roughly proportional to the CR, the temperature of working fluid 116 may be lowered 25% by lowering the CR 25%.

If, for example, cylinder 102 is one cylinder out of six in a 12 liter engine, volume $V_1$ of cylinder 102 will be two liters. It the engine has a CR of 20, volume $V_2$ will be one-twentieth of two liters, or 0.1 liter. CR may be reduced 25%, to 15, by adding an additional 0.03 liter to volume $V_2$, since 2 liters/(0.1 liter+0.03 liter)=15. Since the converse is true as well, the temperature of working fluid 116 may be raised 25% during the compression stroke by closing Suder valve 122 and closing off pre-combustion chamber 120. Therefore, if raising the temperature of working fluid 116 25% during the compression stroke by closing Suder valve 122 was enough to raise the temperature over the kindling temperature of the fuel, the onset of combustion could be controlled with Suder valve 122.

Figure 5:
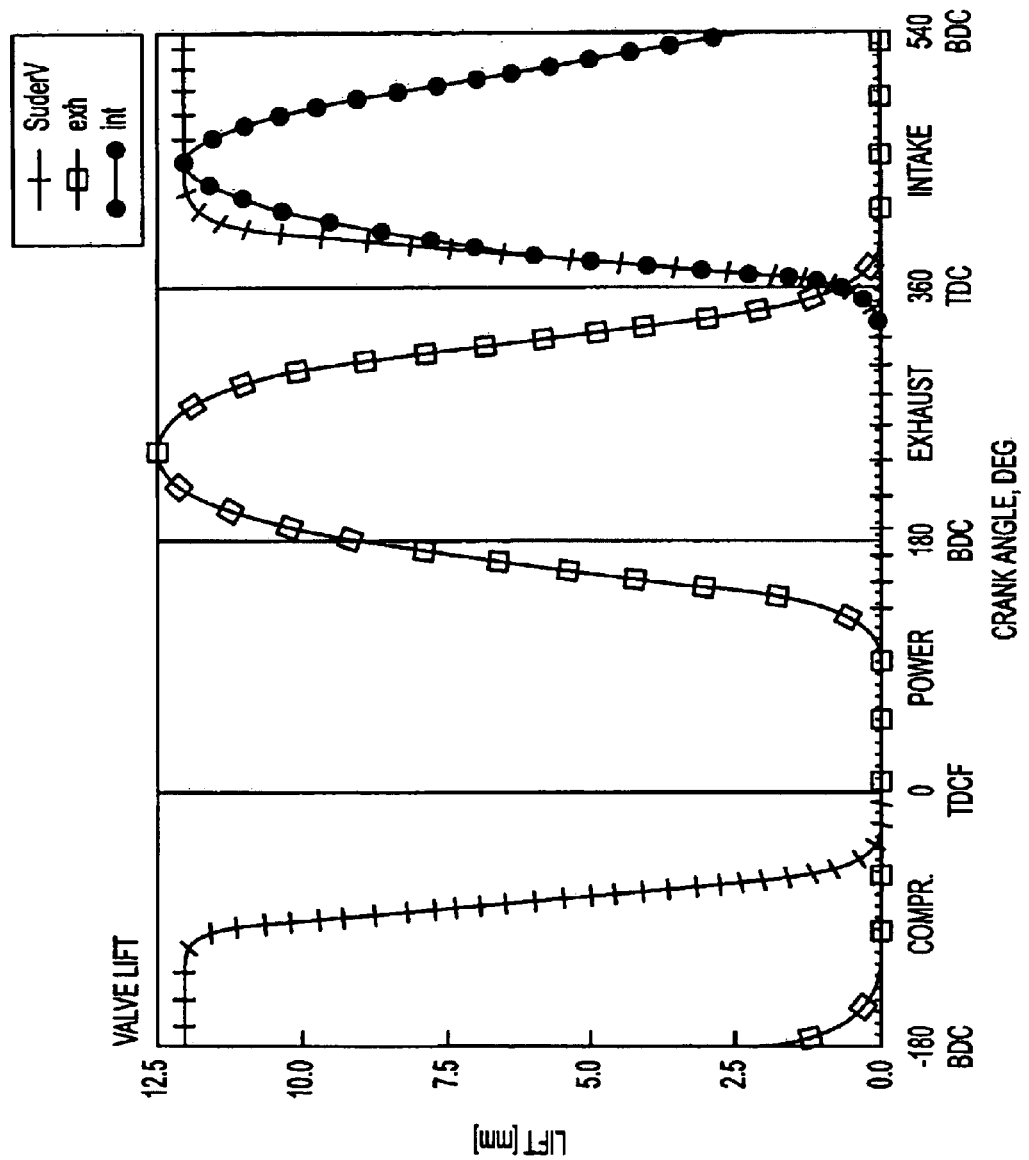
FIG. 5 is a graph of a Suder valve lift versus crank angle for a internal combustion engine according to an embodiment of the invention.

In one embodiment, as shown in FIG. 5, Suder valve 122 opens substantially simultaneously with intake valve 116, Suder valve 122 remains substantially open while piston 108 moves from top dead center position 110 to bottom dead center position 112 during an intake stroke, and Suder valve 122 closes substantially while piston 108 is returning to top dead center position 110 during a compression stroke. In one embodiment, Suder valve 122 closes substantially between a crankshaft angle of about 110 degrees before top dead center position 110 and 50 degrees before top dead center position 110 during the compression stroke.

Figure 6:
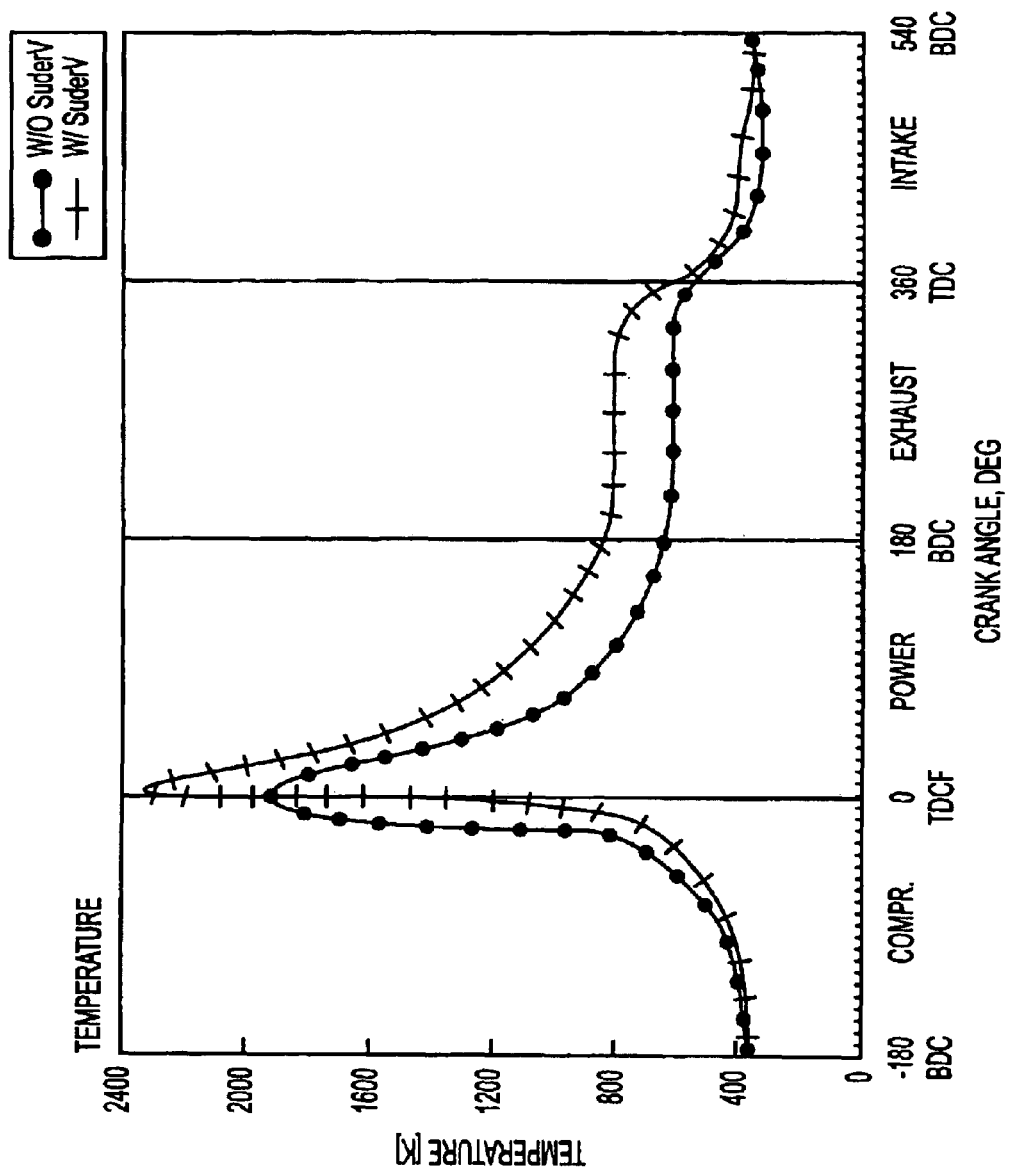
FIG. 6 is a graph of cylinder temperature versus crank angle for a internal combustion engine according to an embodiment of the invention.
Figure 7:
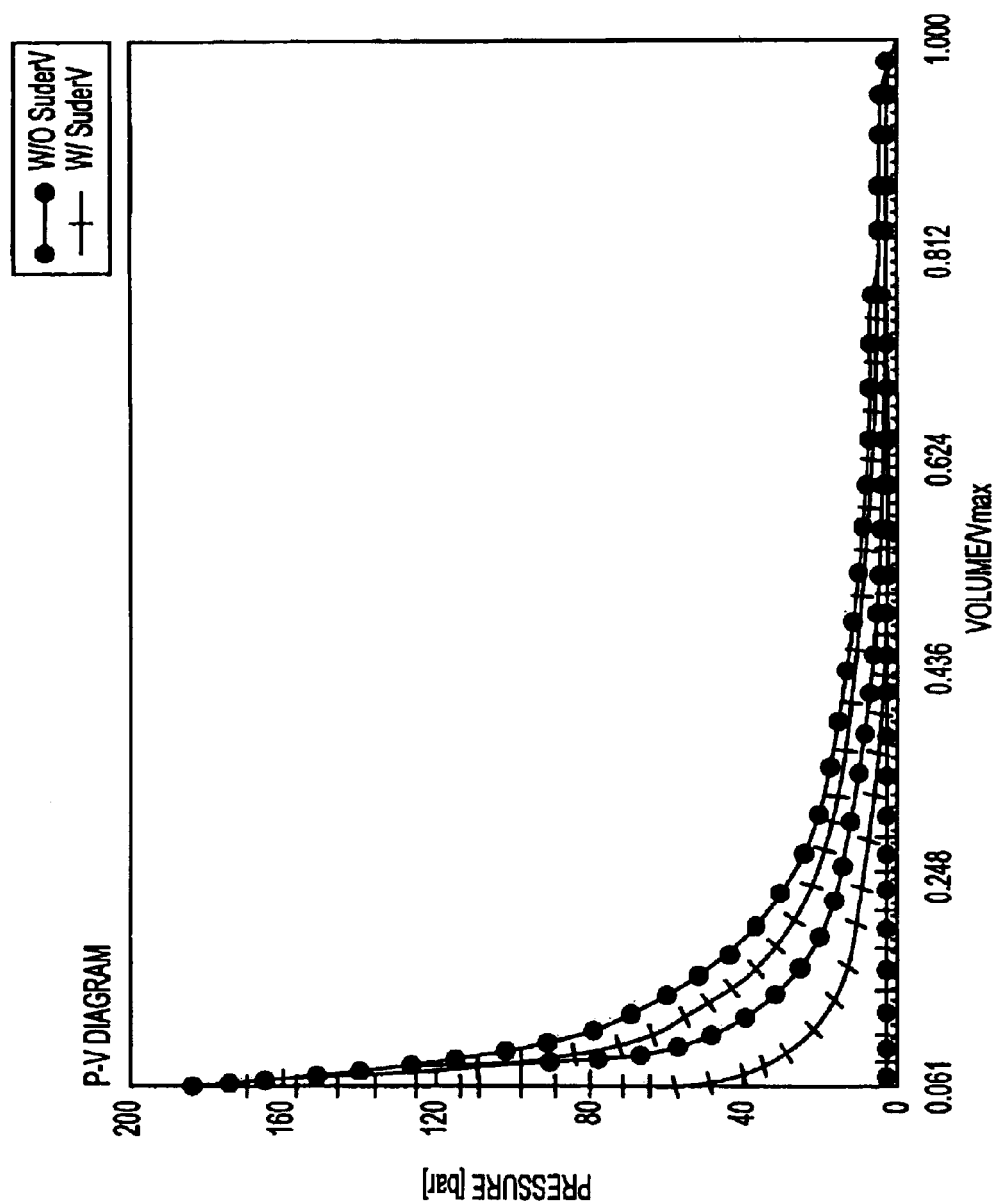
FIG. 7 is a graph of cylinder pressure versus cylinder volume for a internal combustion engine according to an embodiment of the invention.
Figure 8:
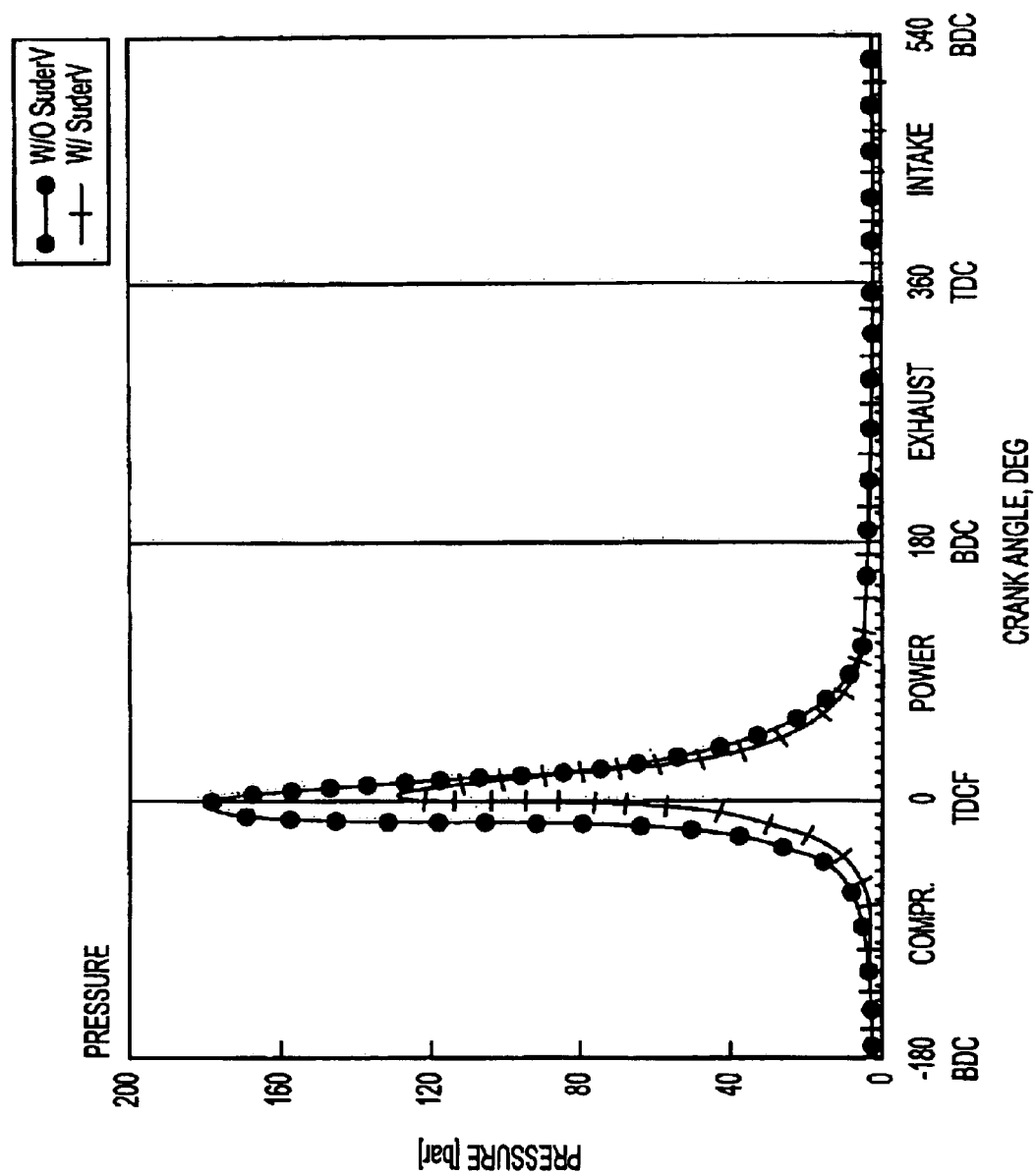
FIG. 8 is a graph of cylinder pressure versus crank angle for a internal combustion engine according to an embodiment of the invention.

In this embodiment cylinder temperature and pressure may made to peak during or after piston 108 is at top dead center position 110, as shown in FIGS. 6 and 8. Furthermore, in-cylinder pressure may be higher as a function of volume, as shown in FIG. 7.

In one embodiment, a volume 130 of combustion chamber 104, or $V_2$, may be 0.1 liter while a volume 128 of pre-combustion chamber 120 may be 0.03 liter. In another embodiment, volume 128 may be about one-third of volume 130. These are exemplary embodiments only, and the actual sizes of the two volumes may vary depending on the engine characteristics.

If volume 128 of pre-combustion chamber 120 were 0.03 liter, volume 128 could be incorporated in a cylinder head containing combustion chamber 104. In one embodiment, pre-combustion chamber 120 may be cored out of a cylinder head 138, as shown in FIGS. 1 and 2.

Suder valve 122 may be incorporated in a passage 140 in cylinder head 138 between combustion chamber 104 and pre-combustion chamber 120. Passage 140 may be cored or machined. In one embodiment, passage 140 is cheeked and contoured to minimize pumping losses associated with working fluid 116 traversing passage 140.

Figure 9:
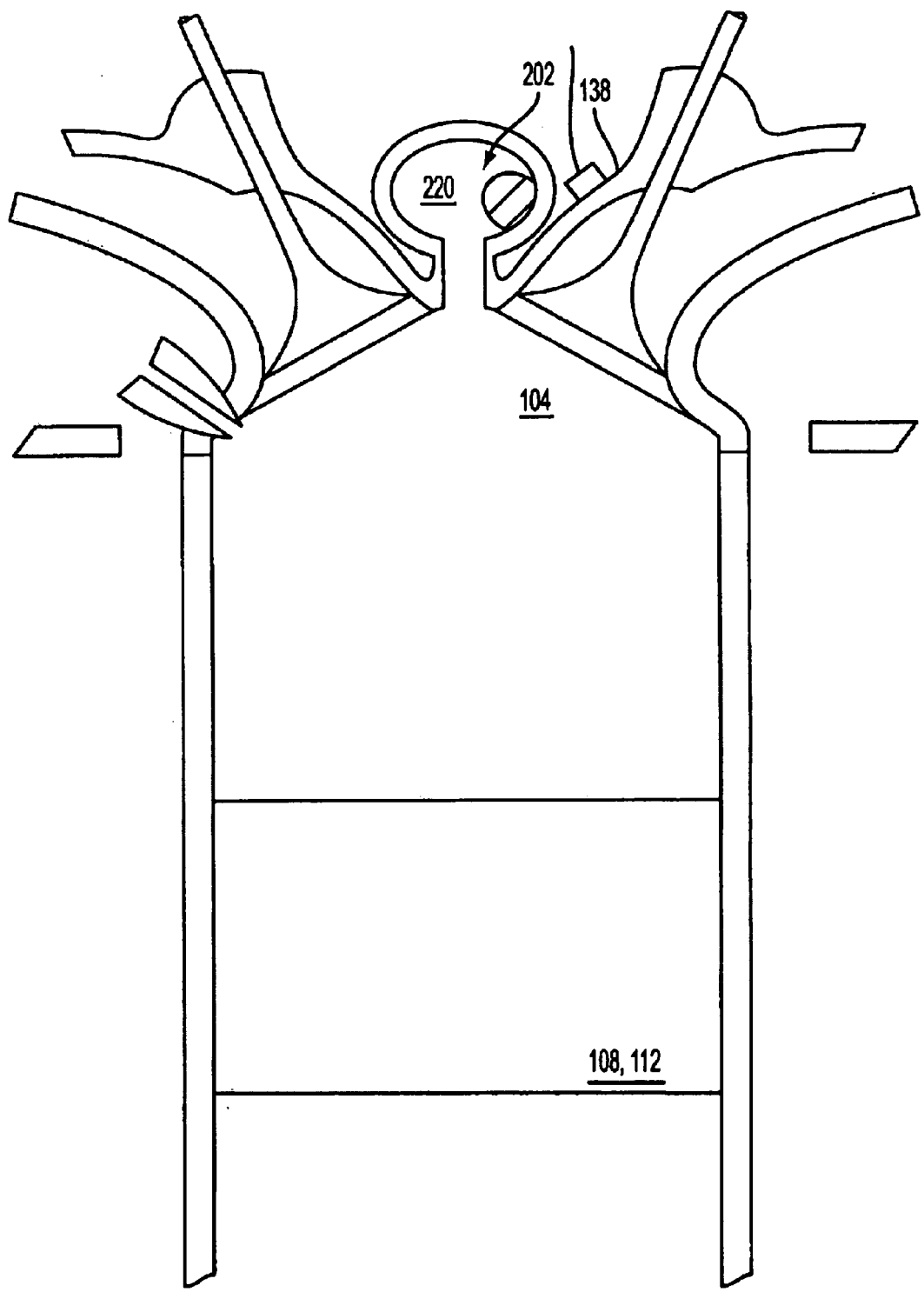
FIG. 9 is a section through an internal combustion cylinder assembly according to a second embodiment of the invention.
Figure 10:
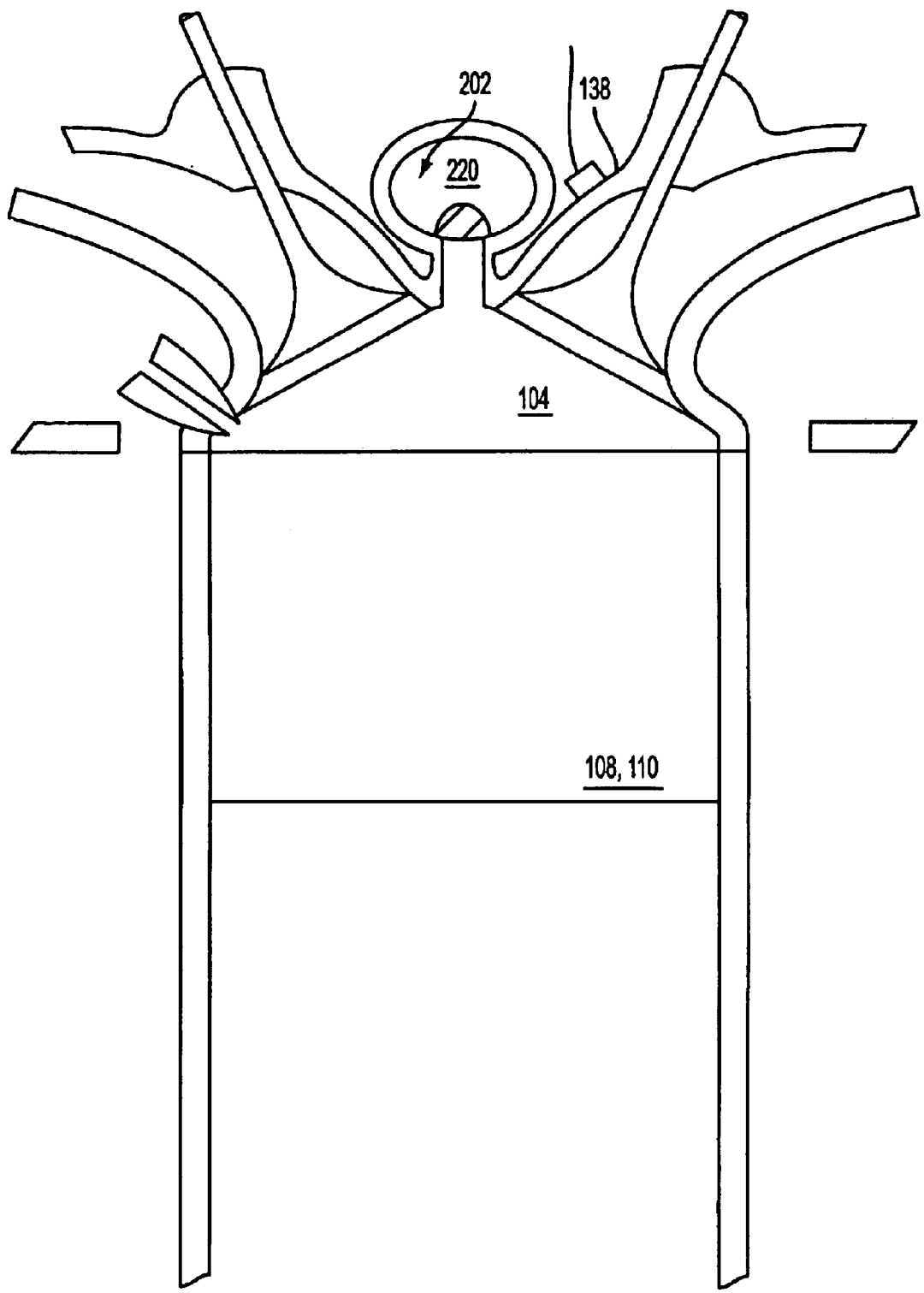
FIG. 10 is a section through the embodiment shown in FIG. 9.
Figure 11:
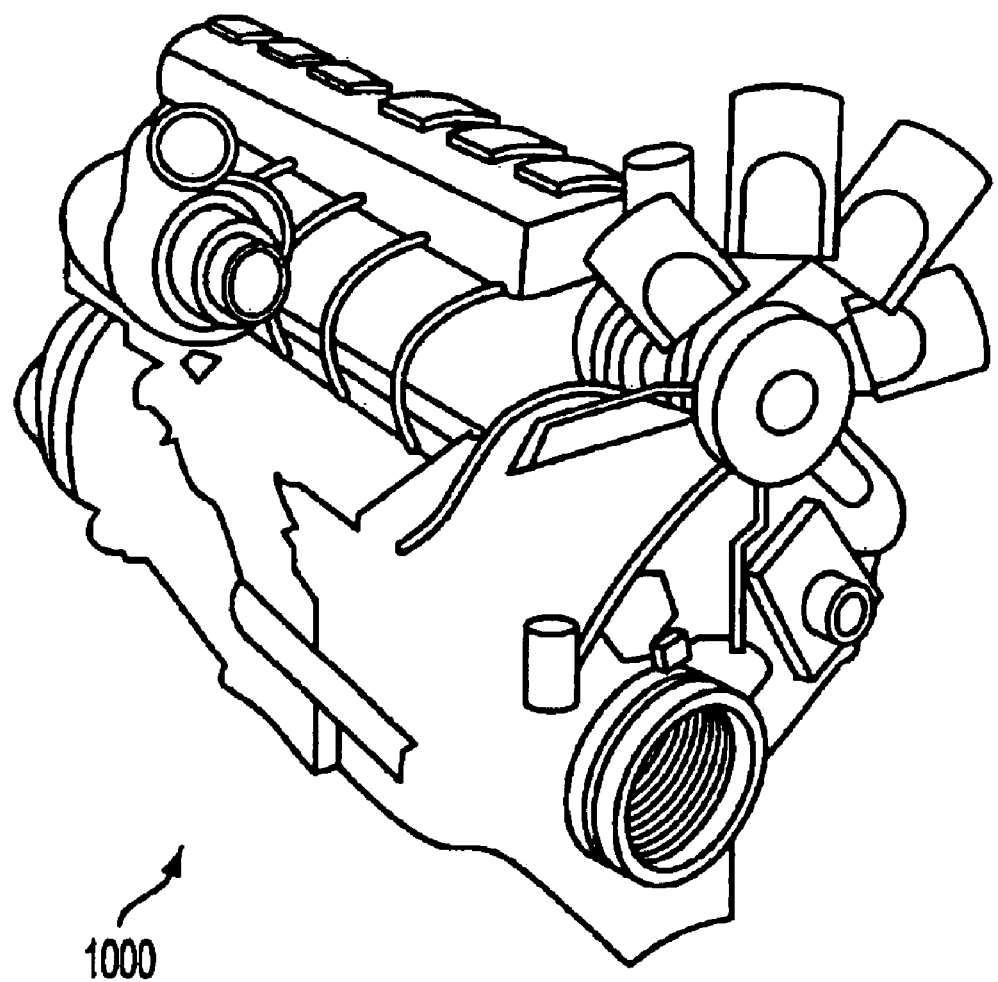
FIG. 11 shows an engine for use with an embodiment of the invention.

In a second embodiment a pre-combustion chamber 220 may be incorporated in a rotating shaft 202 like a rotary valve as shown in FIGS. 9 and 10. Rotating shaft 202 may rotate in bearings at half of the crankshaft speed in cylinder head 138, in the manner of a camshaft. Pre-combustion chamber 220 may thus be contoured to face combustion chamber 104 during most of each compression stroke, but block it just before piston 108 reaches top dead center position 110. The time at which the blocking occurs could be varied by varying the phase of rotating shaft 202 relative to the crankshaft or camshaft.

Cylinder assembly 100 may also include a fuel injector 124 disposed in cylinder 102 head to admit fuel 126 to combustion chamber 104 as shown in FIGS. 1 and 2. In one embodiment, fuel injector 124 admits a pilot quantity of fuel 126 substantially before piston 108 returns to top dead center during the compression stroke. Since pilot quantity of fuel 126 is admitted substantially before piston 108 returns to top dead center, fuel 126 may be able to distribute itself substantially evenly throughout combustion chamber 104 during the remainder of the compression stoke.

In a third embodiment, cylinder assembly 100 also includes a transducer 132 shown in FIGS. 1 and 2 for monitoring a sound power distribution 142 emanating from combustion chamber 104. In one embodiment, transducer 132 may be a piezoelectric element, such as an accelerometer. In another embodiment, transducer 132 is a knock sensor.

Figure 14A:
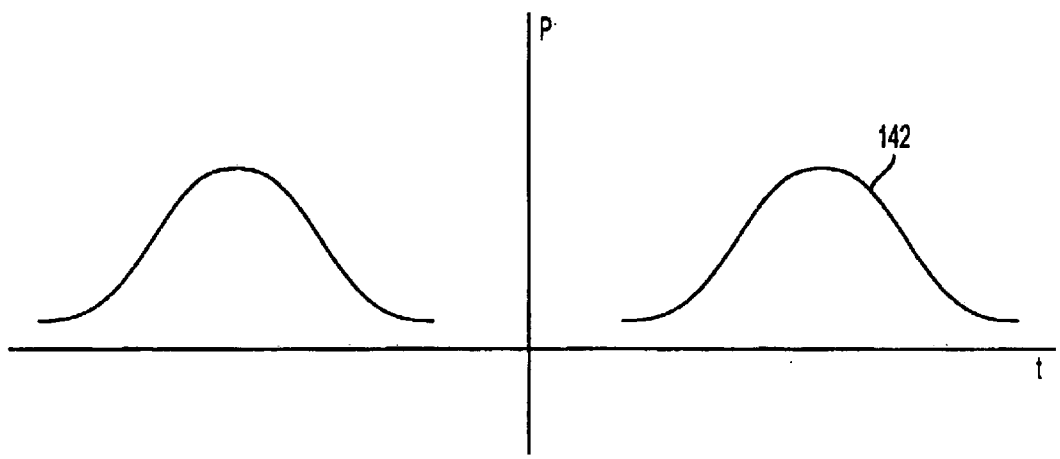
FIG. 14 shows sound power distributions for use with an embodiment of the invention.

Sound power distribution 142 may be analogous to a pressure in cylinder 102, such as a range of pressures across a frequency spectrum, or a pressure differential, such a pressure rise. In several alternative embodiments, sound power distribution 142 may be a distribution of sound pressure or sound power, acceleration, or amplitude of displacement, such as amplitude of vibration across a range of frequencies of vibration, as shown in FIG. 14A.

Figure 14B:
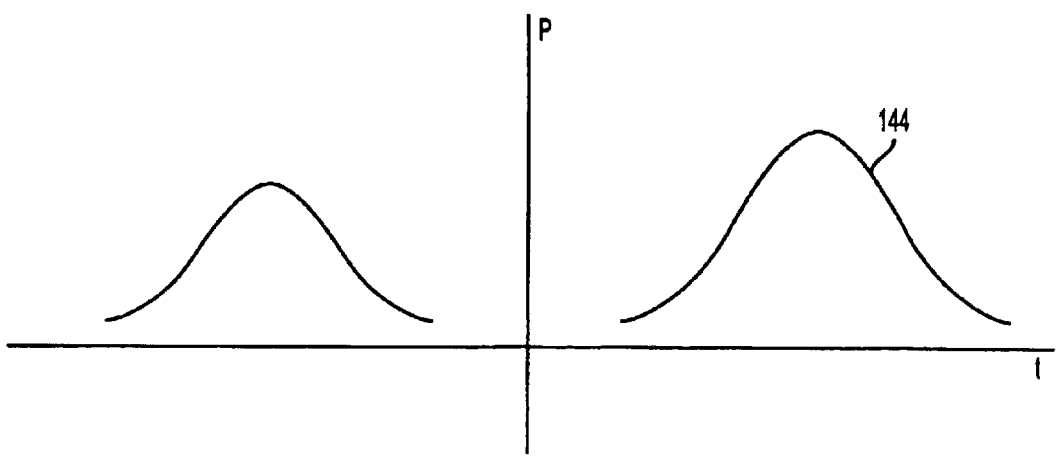

In one embodiment, shown in FIG. 14B, a sound power distribution 144 that is substantially characteristic of auto-ignition or predetonation is determined for a location of transducer 132. Sound power distribution 144 may be analogous to a predetermined pressure in cylinder 142, such as a predetermined range of pressures or a pressure rise known to be associated substantially with the onset of auto-ignition.

Sound power distribution 142 emanating or radiating from combustion chamber 104 at the location of transducer 132 during compression may then compared with sound power distribution 144. If sound power distribution 142 matches substantially sound power distribution 144 before piston 108 is substantially at top dead center position 110, auto-ignition may have begun prematurely.

In one embodiment, if auto-ignition begins prematurely, a time at which Suder valve 122 closes may be retarded to delay the onset of auto-ignition. In another embodiment, a time at which Suder valve 122 closes may be advanced until sound power distribution 142 matches substantially sound power distribution 144, indicating the onset of auto-ignition, and then retarded slightly.

Transducer 132 may monitor sound power distribution 142 directly, or through a proxy such as a head bolt strain or a vibration signature near combustion chamber 104. In one embodiment, transducer 132 exhibits a substantially constant response to pre-detonation. In this embodiment, the predetermined pressure may be a response matched to the known response.

Figure 12:
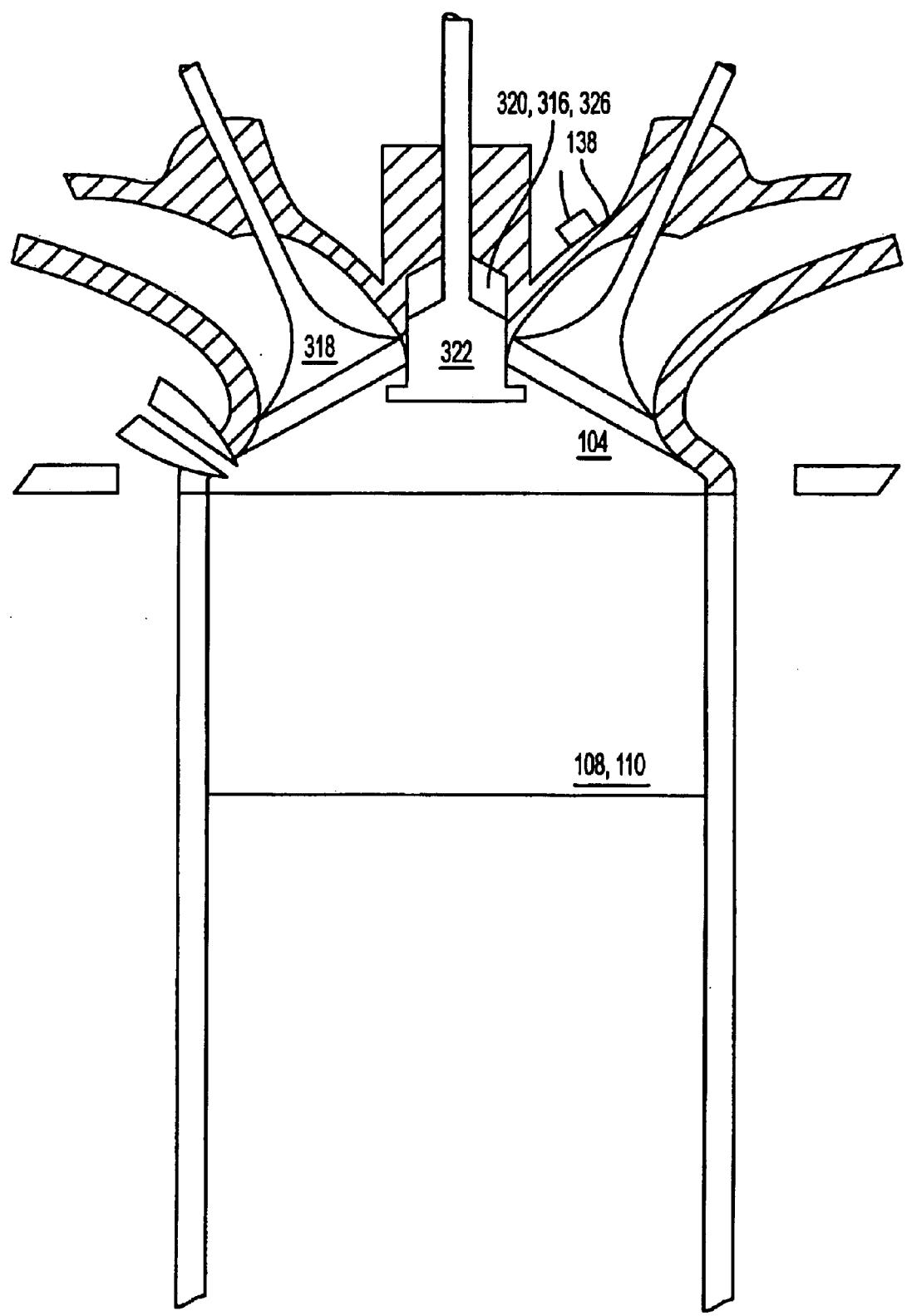
FIG. 12 is a section through an internal combustion cylinder assembly according to a fourth embodiment of the invention.
Figure 13:
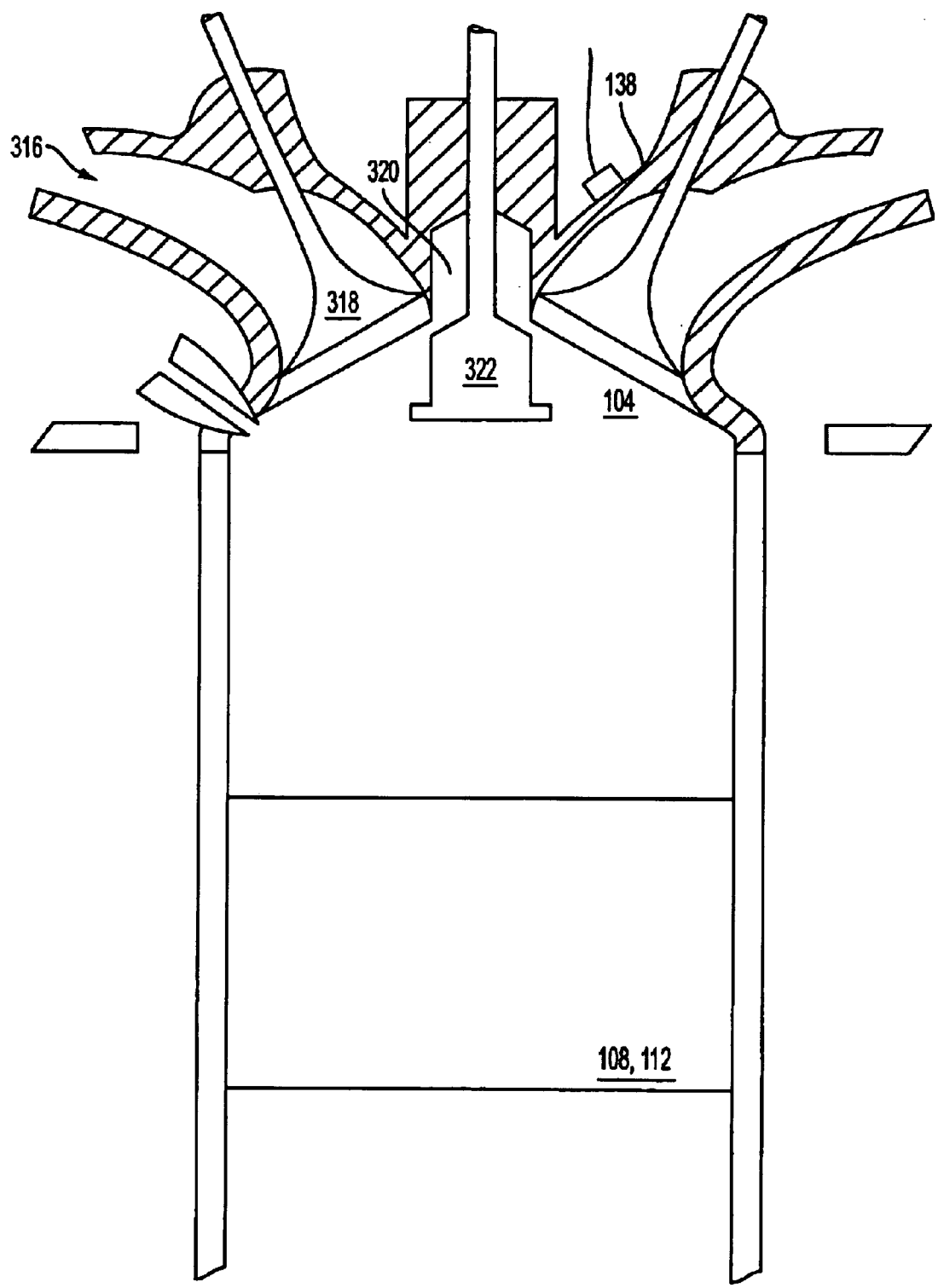
FIG. 13 is a section through the embodiment shown in FIG. 12.

In a fourth embodiment, a Suder valve 322 may be a slide valve or a spool valve running in a pre-combustion chamber 320, as shown in FIGS. 12 and 13. Suder valve 322 may open substantially simultaneously with intake valve 318. Suder valve 322 may remain substantially open while piston 108 moves from top dead center position 110 to bottom dead center position 112 during an intake stroke. Suder valve 322 may close substantially while piston 108 is returning to top dead center position 110 during a compression stroke.

After closing, Suder valve 322 may slide further into pre-combustion chamber 320 instead of just sitting on its valve seat, compressing a working fluid 316 and a fuel 326 inside pre-combustion chamber 320. Consequently, the pressure and temperature inside pre-combustion chamber 320 may rise. Once the temperature inside pre-combustion chamber 320 reaches a auto-ignition trigger temperature of fuel 326, fuel 326 inside pre-combustion chamber 320 may auto-ignite.

Combustion of fuel 326 may cause the pressure inside pre-combustion chamber 320 to rise further and in turn push Suder valve 322 back out of pre-combustion chamber 320, opening Suder valve 322. Once pre-combustion chamber 320 is exposed to the main combustion chamber, the homogeneous air-fuel mixture inside the main combustion chamber gets ignited as well.

After the engine power stoke is completed, Suder valve 322 may slide back into pre-combustion chamber 320 during the engine exhaust stroke relatively slowly to clear out all the exhaust gas inside pre-combustion chamber 320. Then Suder valve 322 reopens during the following intake or compression stroke to let fresh air-fuel mixture flow into pre-combustion chamber 320 again.

In a fifth embodiment, a method of controlling combustion in an internal combustion engine includes connecting pre-combustion chamber 120 to combustion chamber 104, drawing working fluid 116 into cylinder 102 through an intake runner in combustion chamber 104, closing the intake runner with intake valve 118, compressing working fluid 116 in combustion chamber 104 and pre-combustion chamber 120, adding pilot quantity of fuel 126 to working fluid 116 while working fluid 116 is being compressed, disconnecting pre-combustion chamber 120 from combustion chamber 104 before compression is complete, compressing working fluid 116 further in combustion chamber 104, and igniting fuel 126 with heat generated by compressing working fluid 116.

In a sixth embodiment, the method of controlling combustion in an internal combustion also includes monitoring pressure 134 in combustion chamber 104, and retarding the time at which pre-combustion chamber 120 is disconnected from combustion chamber 104 if pressure 134 is greater than the predetermined pressure.

In FIG. 10 is shown an internal combustion engine 1000 according to a sixth embodiment of the invention. In FIG. 10 a plurality of cylinder assemblies 100 may be combined to form an engine 1000. In this embodiment, six cylinder assemblies 100 are combined to form engine 1000. In an alternative embodiment, four cylinder assemblies 100 are combined to form engine 1000. In a further alternative embodiment, eight cylinder assemblies 100 are combined to form engine 1000.

Various numbers of cylinder assemblies 100 may be arranged in, e.g. an in-line, a vee, a radical, an opposed, or a flat configuration without departing from the spirit of the invention. In several embodiments, the invention could be used in, e.g. trucks, tractors, stationary applications, marine applications, agricultural equipment, earth moving equipment, locomotives, or aircraft, including lighter-than-air craft.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An internal combustion cylinder assembly comprising:
    a cylinder having a combustion chamber at an end thereof;
    a piston disposed slidably within said cylinder, said piston having a top dead center position substantially proximate to said combustion chamber and a bottom dead center position substantially distal from said combustion chamber;
    an intake runner connected communicably to said combustion chamber via an intake valve, said intake runner providing a working fluid to said combustion chamber while said intake valve is substantially open and said piston moves from said top dead center position to said bottom dead center position;
    a pre-combustion chamber connected communicably to said combustion chamber via a Suder valve, said combustion chamber conveying a portion of said working fluid to said pre-combustion chamber while said Suder valve is substantially open;
    wherein said Suder valve opens substantially simultaneously with said intake valve, said Suder valve remains substantially open while said piston moves from said top dead center position to said bottom dead center position during an intake stroke, and said Suder valve closes substantially while said piston is returning to said top dead center position during a compression stroke.

2. The internal combustion cylinder assembly of claim 1, comprising further:
    a fuel injector disposed in said cylinder head to admit fuel to said combustion chamber, said fuel injector admitting a pilot quantity of fuel substantially before said piston returns to said top dead center during said compression stroke.

3. The internal combustion cylinder assembly of claim 1, wherein said Suder valve closes substantially between a crankshaft angle of about 110 degrees before said top dead center position and 50 degrees before said top dead center position during said compression stroke.

4. The internal combustion cylinder assembly of claim 1, wherein said Suder valve is selected from the group consisting of:
- a gate valve,
- a rotary valve,
- a slide valve,
- a spool valve,
- a sleeve valve, and
- a poppet valve.

5. The internal combustion cylinder assembly of claim 1, wherein said Suder valve is actuated by an actuator selected from the group consisting of:
- a cam lobe,
- an hydraulic actuator,
- a piezoelectric motor,
- a voice coil, and
- a solenoid.

6. The internal combustion cylinder assembly of claim 1, wherein a volume of said pre-combustion chamber is about one-third of a volume of said combustion chamber when said piston is at said top dead center position.

7. The internal combustion cylinder assembly of claim 1, comprising further:
- a transducer monitoring a pressure in said combustion chamber; and
- wherein a closing of said Suder valve is retarded if said pressure is greater than a predetermined pressure.

8. The internal combustion cylinder assembly of claim 7, wherein said predetermined pressure indicates an onset of combustion.

9. The internal combustion cylinder assembly of claim 1, wherein said working fluid in said pre-combustion chamber is substantially compressed after said Suder valve closes substantially while said piston is returning to said top dead center position during a compression stroke.

10. The internal combustion cylinder assembly of claim 9, wherein a fuel in said working fluid in said pre-combustion chamber auto-ignites after said Suder valve closes substantially while said piston is returning to said top dead center position during a compression stroke.

11. A method of controlling combustion in an internal combustion engine comprising:
- connecting a pre-combustion chamber to a combustion chamber;
- drawing a working fluid into a cylinder through an intake runner in said combustion chamber;
- closing said intake runner with an intake valve;
- compressing said working fluid in said combustion chamber and said pre-combustion chamber;
- adding a pilot quantity of fuel to said working fluid while said working fluid is being compressed;
- disconnecting said pre-combustion chamber from said combustion chamber before said compression is complete;
- compressing said working fluid further in said combustion chamber; and
- igniting said fuel with heat generated by compressing said working fluid.

12. The method of controlling combustion in an internal combustion engine of claim 11, comprising further:
- monitoring a pressure in said combustion chamber; and
- retarding disconnecting said pre-combustion chamber from said combustion chamber if said pressure is greater than a predetermined pressure.

13. The method of controlling combustion in an internal combustion engine of claim 11, comprising further:
- compressing said working fluid further in said pre-combustion chamber.

14. The method of controlling combustion in an internal combustion engine of claim 13, comprising further:
- igniting fuel in said working fluid in said pre-combustion chamber.

15. A system for controlling combustion in an internal combustion engine comprising:
- means for connecting a pre-combustion chamber to a combustion chamber; means for drawing a working fluid into a cylinder through an intake runner in said combustion chamber;
- means for closing said intake runner with an intake valve;
- means for compressing said working fluid in said combustion chamber and said pre-combustion chamber;
- means for adding a pilot quantity of fuel to said working fluid while said working fluid is being compressed;
- means for disconnecting said pre-combustion chamber from said combustion chamber before said compression is complete;
- means for compressing said working fluid further in said combustion chamber; and
- means for igniting said fuel with heat generated by compressing said working fluid.

16. The system for controlling combustion in an internal combustion engine of claim 15, comprising further:
- means for monitoring a pressure in said combustion chamber; and
- means for retarding disconnecting said pre-combustion chamber from said combustion chamber if said pressure is greater than a predetermined pressure.

17. The system for controlling combustion in an internal combustion engine of claim 15, comprising further:
- means for compressing said working fluid further in said pre-combustion chamber.

\* \* \* \* \*